Dec. 7, 1971  E. F. BRANNAKER  3,624,849
DEVICE FOR LOCATING A SUBMERGED ITEM
Filed Nov. 6, 1969
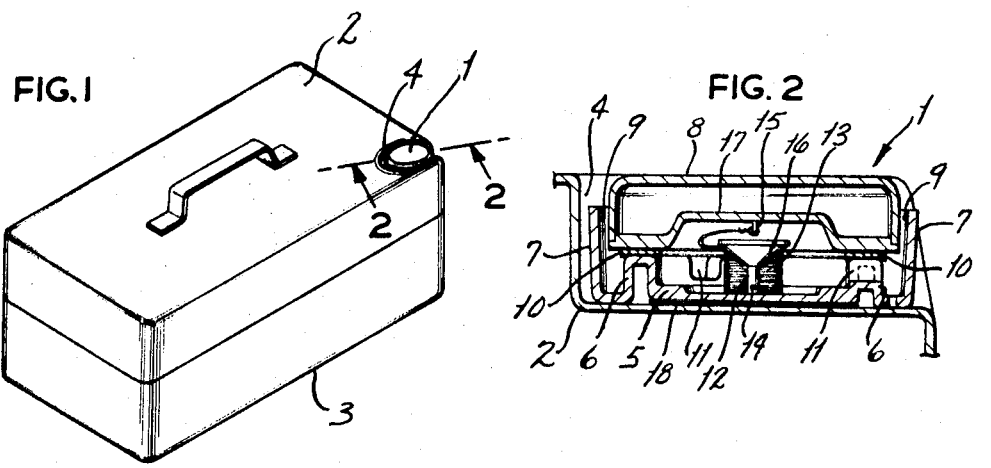
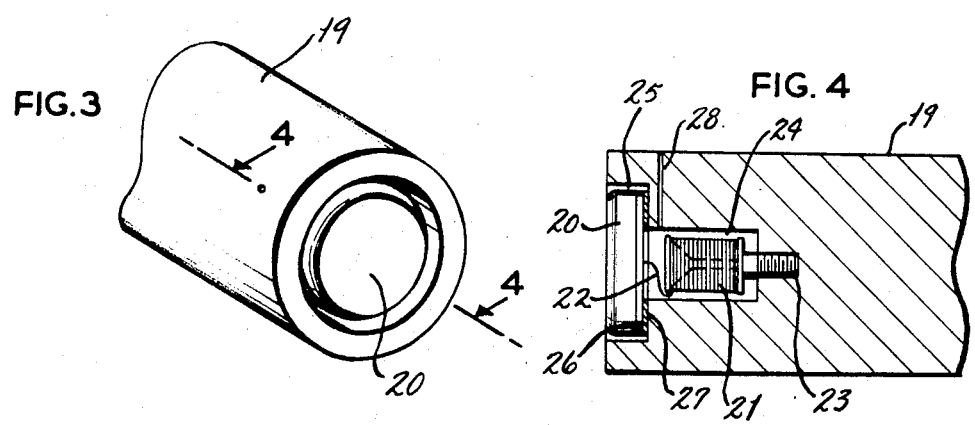
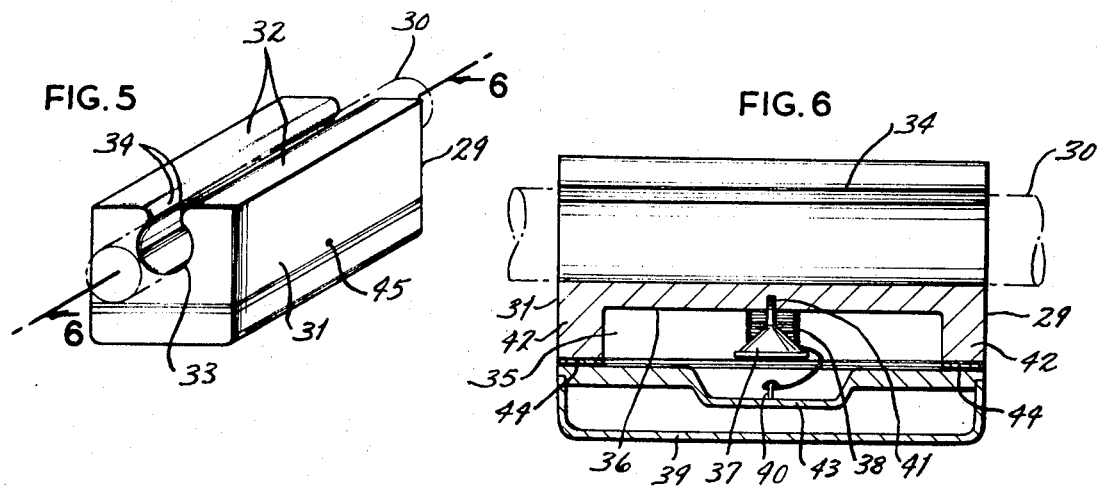
INVENTOR
ELMER F. BRANNAKER
BY Paul M. Denk
ATTORNEY

United States Patent Office 3,624,849
Patented Dec. 7, 1971

3,624,849
DEVICE FOR LOCATING A SUBMERGED ITEM
Elmer F. Brannaker, 811 Brookvale Terrace,
Manchester, Mo. 63011
Filed Nov. 6, 1969, Ser. No. 874,487
Int. Cl. B63c 7/26
U.S. Cl. 9—9                                                4 Claims

ABSTRACT OF THE DISCLOSURE

A device for indicating the location of submerged items which includes a base member that is generally formed having a spool means mounted centrally to it, with the sides of said base member projecting upwardly coextensive with the spool means so as to provide for its shelter, a float connects by means of a soluble glue and/or an intermediate porous member to the base member, and a length of line is normally wound around said spool connecting to said base member at one end, with the other end of said line attaching to the float; when the item to which this device connects becomes submerged in water the soluble glue rapidly dissolves allowing for the float to elevate to the surface, thereby indicating the location of the submerged item. In other embodiments, the base member is formed having a clip-like arrangtment for mounting of the device to, as for example, a fishing rod, while in another embodiment the spool and float may be connected inwardly of a series of cavities provided in the end of a handle portion of a fishing rod, and function similarly to the device previously described to indicate the location of the rod in the event that it is lost in any depth of water.

BACKGROUND OF THE INVENTION

This invention generally relates to a device for indicating the location of an item dropped in water, and more particularly, relates to a float arrangement which is compactly constructed and may be rapidly attached to any particular item that is frequently used around the water, as for example fishing gear, so that in the event such an item is accidentally dropped into water a float will shortly appear upon the surface to indicate the precise location of the lost item.

Heretofore a variety of retrieving devices or other types of float arrangements for use in recovering sunken articles have been devised, and most of such devices are organized and constructed to operate under the principle that a float is released for surfacing upon water after a deliquescent pill dissolves providing for release of said float. Most of these prior art devices, although they are effective in usage, are qiute complicated in structure, expensive to manufacture, and have the inherent detriment that any accidental wetting of the device as when attached to a product or item, such as fishing gear, will initiate a ceaseless dissolving of the deliquescent material, which process cannot be checked or stopped. Other devices previously designed include rather ingenious means for propelling the float away from the submerged item by use of either a spring or compressed gas developed from the wetting of the deliquescent material.

In those particular devices disclosed in the prior art which incorporate the use of a soluble glue or other material to retain the float connected to its base member or to the item itself to be located, these devices also are rather complicated in structure and contain inherent deficiencies that limit the range of their use. For example, in the patent to Yurkinas et al., No. 3,085,263 and the patent to Berndt, No. 2,198,755, should the items, namely a fishing rod and motor boat, become submerged in water and locate upon the river bed or lake bottom in an orientation that disposes the float device downwardly, regardless that the soluble glue of each device may completely dissolve in water, the floats will never become free for floating to the surface. And even if they should, their spool or reel for holding the cable will have become so embedded in the mud that their lines will not be free to unwind. Furthermore, other retrieving devicts, such as the bouy disclosed in the Foss et al. patent, No. 3,334,364, are rather delicately constructed that apparently it would be difficult to employ them effectively with such cumbersome items as a roughly and continuously handled boat motor, or other gear. It is not suggested that any of these prior art devices are inoperative, or that they will not work under certain conditions, but rather, they do lack certain features which are believed to be emboditd as improvements in this present invention. It is, therefore, a principal object of this invention to provide a float device for indicating the location of water submerged items wherein the float and other operative features of the device, such as the spool means and line, are readily protected and shielded against the hazards associated with the usual rough handling encountered by the items to which this device attaches.

It is a further object of this invention to provide an item for identifying submerged items wherein its float attaches by means of a water porous and soluble connection to a base member which rigidly attaches the float to the item, but provides for its accelerated loosening due to the porosity of the water soluble attachment means.

It is a further object of this invention to provide a float device for locating submerged items which may be rapidly attached to the item, and in certain instances in a manner which conceals its presence.

It is a further object of this invention to provide a float device which allows for the immediate access of water to its soluble connecting means to provide for its rapid dissolving and an immediate release its associated float.

It is another object of this invention to provide a float device for locating submerged items which includes a spool means having a well drafted end which facilitates the unobstructed release of line under the influence of the attached and surfacing float.

It is an additional object of this invention to provide a device for locating submerged items, which may be rapidly attached to any type of item, compact in construction, uncomplicated in operation, and which remains unoperative until fully submerged in water at least for some length of time.

These and other objects will become more apparent to those skilled in the art in light of the following description and accompanying drawings.

SUMMARY OF THE INVENTION

This invention discloses an improvement in a float device that may be easily and conveniently attached directly to a submergible item, and in the event that the item should become accidentally lost in a body of water the float device will immediately commence to deliver its float to the surface of the water to indicate the precise location of the otherwise lost item. The device contemplates the use of a base member which is disposed for prompt attachment to the item to be identified, and in addition, is constructed for normal retention of the float through the agency of a water soluble adhesive and adhering member. Furthermore, the base member is normally provided with an outer shell or encasement which performs as a means for sheltering both the float and a spool means retaining a line, so that while the float device is adhered to any item, such as a fishing gear, this outer encasement will prevent an untimely jarring of the float loose. And, when the item should ever become negligently or accidentally dropped into the water, while the float becomes loosened and elevates to the surface, this side encasement will prevent any interference with the normal withdrawal of the line from the spool under the force of the surfacing float which interconnects to the base member by means of the previously spooled line.

It is essential that the float member be fairly rigidly secured to the base member so that any jarring or shaking of the item to which it attaches will prevent an untimely loosening of the float, as previously described, but at the same time, the means adhering the float to the base member must be sufficiently soluble or porous so as to allow the water to pervade therein and induce prompt solubility of said means for releasing the float from its base member. This invention contemplates the use of a number of improvements to achieve the foregoing result, and one such improvement includes a series of apertures through the base member so as to allow water not only to contact the outer exposed edges of the soluble adhering means, but also to allow the water to seep through the base and attack the soluble means also from its inner edges. Under this arrangement, the soluble means is quickly softened so as to allow a fairly rapid release of the float from its mounting base member. An additional improvement which accelerates the foregoing process is the inclusion of a porous member, such as a cardboard or other rapidly water absorbing material intermediate the float and where it mounts to the base member, also utilizing a soluble glue on either side of said porous member which attaches the same to both the float and the base member, so that as water pervades around this particular location, it will be rapidly absorbed into the porous member, and thereby attack the soluble glue not only on its edges but also upon its surfaces. In this manner, the porous member in combination with the soluble glue is effective in rigidly adhering the float to the base member, but as soon as the device becomes fully submerged in water for a short length of time, water will be promptly absorbed within the porous member for dissolving the adhesive connection.

This invention, and more particularly its base member component, is formed so that it may be connected to any type of item which is normally utilized around water and can be accidentally dropped into the same, such as fishing gear in the category of a tackle box, a fishing rod, or the like. In one embodiment of the device, its spool means may be fastened directly into a cavity axially formed into the end of a fishing rod handle, and the float, interconnecting by a line to the spool, may also be mounted by means of the water soluble glue and/or porous member into a second and more enlarged cavity in the end of said rod handle thereby providing a means for locating said rod in the event that it is ever dropped into water; said locating device under normal usage and conditions being reasonably hidden from view and being of no obstruction to the angler making use of the same.

BRIEF DESCRIPTION OF THE DRAWING

In the drawing,

FIG. 1 is a perspective view of a fishing tackle box, or the like, having the float device of this invention adhering within a shallow cavity proximate one corner of said box;

FIG. 2 is a sectional view through a small portion of the tackle box lid and entirely transversely through the float device of this invention taken along the line 2—2 of FIG. 1;

FIG. 3 provides a perspective end view of a part of a fishing rod handle showing the float device being embedded within this end;

FIG. 4 is a sectional view through the fishing rod handle, taken along the line 4—4 of FIG. 3, but showing the float device in its full embodiment;

FIG. 5 provides a perspective view of another embodiment in the float device of this invention being attached to the fishing rod itself; and FIG. 6 is a sectional view of the fishing rod and attached float device taken along the line 6—6 of FIG. 5.

DESCRIPTION OF THE PREFERRED EMBODIMENT

Referring now to the drawing for one illustrative embodiment of the float device of this invention, in FIG. 1, reference numeral 1 generally indicates the float device as it is attached to the lid 2 of a tackle box 3. The float device 1 is conveniently attached to the lid of the tackle box within a cavity 4 formed within the same proximate one corner thereof, so that the device does not project above the top of the tackle box, and will not be exposed for being jarred or knocked loose therefrom.

By referring to FIG. 2, the specific construction of the float device 1 is more accurately disclosed as being mounted within the cavity 4 of the lid 2 of the tackle box. The device comprises a base member 5 formed having a bossed portion 6 which protrudes upwardly from the lower portion of said base member, said base member further including an outer shell 7 which surrounds the base member, and protects its operative components disclosed therein. Mounting upon the bossed portion of the base member is a float 8 which is hermetically sealed so as to prevent the entrance of any water therein, which float when submerged in water will eventually and naturally elevate to the surface of the same to provide an indication of the location of the submerged item or tackle box 3, to which the device connects. A spacing, as at 9, is provided intermediate the sides of the float 8 and the shell or shield 7, so as to permit the entrance of water therethrough and to the soluble means 10 disposed for normally retaining said float to its base member. This securing means 10 may be a water soluble adhesive, in and of itself, such adhesives as are manufactured and available upon the market from a number of sources, including the adhesive entitled "Elmer's Glue" which can be acquired form the Borden Chemical Company. Furthermore, this adhering means can also include a sheet of porous material, such as laminated cardboard, or any other form of spongelike composition which can be acquired in a thin sheet and which rapidly absorbs water, with the aforesaid soluble glue then being adhered to either side of this porous material so as to adhere the same intermediate the float and the base member, securing the two together. As water then enters into and through the passage 9, it can be rapidly absorbed by the porous member, dissolve the soluble glue, and allow for a discharge of the float from its base member. To facilitate and render rapid the release of the float from the base member of the device, a series of apertures, as shown at 11, provided through the bossed portion allows for the passage of water into the interior spacing intermediate the float and base member, so as to allow the water to attack the adhering means and soluble glue from the inner side. Connecting centrally to the base member 5 is a pool 12, which integrally connects with said base member, said spool being disposed for retention for a supply of line 13, said line being of nylon or any other type and having the desired test pound of strength, one end of said line being attached to the spool means 12 by connecting through its aperture 14, with the other end of the line being attached to a hookeye 15 that is secured to the float 8. So as to facilitate the gradual withdrawal of the line from this spool means, as when the float is elevating to the surface of a body of water, the end of the spool means 12 is drafted, as at 16, so as to prevent any obstruction to the release of the line during this function. It is also to be noted that the float 8 is provided with an upward indentation, as at 17, so as to provide clearance for the enclosed spool means.

This entire float device may be constructed of any type of durable material, such as a plastic, which can withstand a moderate degree of rough handling. The entire float device may be rapidly adhered to any item, such as the tackle box 3, by simply compressing its double-sided adhesive connector 18 onto the item to which it is desired to mount the device. Due to the connector 18 having adhesive on both of its sides, said connector will already have been attached to the underside of the base member 5, and the purchaser of the device may then simply remove a common cover from the bottom side of the adhesive connector, and then rapidly attach by means of pressure the entire float to the lid of the tackle box. Many forms of these double-sided adhesive connectors are available upon the market, such as the Scotch-Mount Tape No. 4032 Pressure Sensitive High Density Foam, as manufactured by the 3–M Company, of Minneapolis, Minn.

It is to be particularly noted that the outer shell portion 7 of the base member extends upwardly at least above the upward extension of the spool means 12, so that in the event that the item, or tackle box, when dropped into water should become rested on its side, or have any obstruction over its lid 2, once the float has been released, the shell 7 will prevent any obstruction to the gradual release of the line from the spool.

By referring to FIGS. 3 and 4, a further embodiment in the float device of this invention is disclosed. There is herein shown the handle portion 19 of, for example, a fishing rod, having a float device 20 mounted into its end. The arrangement of this device includes a spool means 21, similar in construction to the spool means previously described which spool means contains a length of line 22 that connects to the floats 20. The spool means 21 may be fastened inwardly of the rod 19 by means of a common fastener such as through the use of threads 23, said spool means also being located within the inner of a double tiered cavity 24, so as to provide for its total enclosure within the handle of the fishing rod. Likewise, the float 20 is located within the outer cavity 25, and mounts by means of a water soluble connecting means 26 to the wall or outer tier 27 of the cavity. When the rod has become submerged in water, as due to its accidental falling into the same, water will be allowed to pass through the cavity 25 and commence to loosen the adhesive connection 26 holding the float to the rod. Additionally, water will also be allowed to pass through the aperature 28 and into the inner cavity 24, to thereby pervade around the inner edge of the water soluble connector to gradually cause its loosening proximate this area. Where this water soluble adhesive connector is formed including a porous member, as previously described, the loosening of the float from the handle will actually be accelerated. It is to be noted that the spool means 21 is disposed conveniently inwardly of the various cavities formed in the handle end of the rod, so that when the rod becomes disposed in water and resting upon the bottom of the same, the line may easily be withdrawn from the drafted end of the spool without any obstruction. The sides of the rod forming the double tiered cavity act as a shield against any obstruction to the line as contained upon the spool means, and as it is gradually withdrawn therefrom by means of the surfacing float 20.

By referring to FIGS. 5 and 6, a further embodiment in the float device of this invention is set forth. The float device 29 is herein shown mounting to a rod-like member 30, such as the standard fishing rod, with said float device including a base member 31 formed having a bifurcated portion 32 being generally formed having a longitudinal cylindrically shaped cavity 33 disposed therethrough, with the upper edges of said cavity being of narrowing dimensions, as at 34, so as to provide for a snug snap-on adherence of the float device 29 upon the rod 30 after it has been attached in place. Naturally, the base member 31 may be constructed of a more resilient and pliable type plastic, or other material, so as to allow for some tolerance of play between its edges 34 to achieve this snapping function. The base member 31 is formed having an inner cavity 35 located therein, and connecting to the inner surface 36 of said cavity is a spool means 37 for use in retention of a length of line 38 which connects both to the base member and the float 39 by connecting to the hookeye 40. This spool means 37 attaches by any common fastener, such as a threaded end 41 to the base member, and extends approximately perpendicularly therefrom. It is to be noted that the spool means, including its drafted end, is slightly less in extension than the sides 42 of the base member, so that these sides may provide some protection for the spool means and its line after it has come to rest along with the item upon the bottom of the body of water, and as the line is being slowly withdrawn by the surfacing float. This float is formed having a slightly indented cavity 43 so as to provide proper clearance for the spool means disposed therein. The float attaches to the sides 42 of the base member by means of any form of soluble connection, such as the adhesive glue, as shown at 44.

When the fishing rod and the float device 29 have fallen into the water, the float itself will not be sufficient to retain the rod surfaced, so therefore the entire combination will gradually sink to the bottom of the water and rest upon its bed. Then, water will commence to dissolve the soluble means 44, either by its making contact along the outer edges of said soluble means, or through its entrance into and through the aperture 45 into the cavity 35 wherein it will also attack the inner edges of the soluble means. If the soluble means has been constructed as previously described, including not only a soluble glue, but also a porous member, then the water will also penetrate into said porous member and soften the glue, and dissolve the same along its entire surface. After this action is continued for a few moments, the float will eventually break loose from its securement to the base member and commence to elevate to the surface of the water, attracting and withdrawing the line 38 with it. Once the float has surfaced, it will provide an indication of the location of the submerged fishing rod.

Another benefit from the operation of the float device as disclosed in these three embodiments, as previously described, is that by having the spool means connecting directly to the item that may be submerged in water, once the float has reached the surface of the water, it will discontinue its withdrawal of line from the spool. Therefore, the user of the lost item will have a fairly exact indication of the exact location of the lost item. Hence, in the event that the item to which the float attaches was a heaver object, such as a heavy tackle box, or a boat motor, obviously the line will not be of sufficient strength to allow the surfacing of the object through a drawing up of the line, but rather will require the use of a swimmer or diver to retrieve the same. Thus, in having the spool means attaching directly to the float, only that quantity of line required to allow surfacing of the float will be released from the spool. Hence, the surfaced float will not present itself a great distance downstream from where the item is actually located on the bottom of the river or lake bed. On the other hand, this invention, in the alternative, does comtemplate the attachment of the float means directly to the float instead of only to the base member, where this type of embodiment is found more desirable.

Numerous variations in the construction of the float device of this invention, within the scope of the appended claims, will occur to those skilled in the art in light of the foregoing disclosure. The described embodiments are merely illustrative.

Having thus described the invention, what is desired to be secured by Letters Patent is:

1. A device for indicating the location of an item submerged in water, comprising a base member formed having an outer surface part of which is constructed for securement to the item to be located, a spool means including a length of line permanently secured centrally to the inner surface of said member, said spool projecting approximately perpendicularly from the inner surface of said member to facilitate the removal of said line, said member having an integral boss-like projection also extending from said inner surface and being located approximately surroundnig said spool means, a float having dimensions slightly less than the width of said base member, said float disposed for normal securement to said base member mounting upon said boss, a shield formed integrally of said base member and disposed for surrounding in contiguously said float, a water porous member cooperating with a soluble adhesive means disposed intermediate said float and said boss to retain the same normally adhered together, a saturation of said porous member effecting a wetting of said soluble adhesive means providing for an eventual separation of said float from said base member, at least one opening formed through said boss to allow for passage of a quantity of water therethrough to facilitate the pervasion of the water during the wetting process, the shield formed of said base member extending at an angle from the surface of said base member and shielding said spool means, its line, boss-like projection and the float disposed therein, the ends of said line being attached respectively to the spool means and the float, and said line functioning as a link between the surfaced float and the base member as attached to the submerged item.

2. The invention of claim 1 wherein the boss-like projection of said base member is annularly disposed protectingly around the spool means, and the underside of the float is formed having a cavity therein to provide clearance for the spool means when said float is adhering to the base member.

3. The invention of claim 2 wherein said spool means is provided with a drafted end to ease the continuous withdrawal of the line as the float is elevating to the surface of the water.

4. The invention of claim 1 wherein the means for securement of the base member to the item comprises a double-sided pressure sensitive adhesive seal which allows the device to be rapidly secured to an item.

References Cited
UNITED STATES PATENTS

| | | | |
|---|---|---|---|
| 1,719,838 | 7/1929 | Haselton | 9—9 |
| 2,806,231 | 9/1957 | Hofmeister | 9—9 |
| 3,105,980 | 12/1963 | Hinman | 9—9 |

MILTON BUCHLER, Primary Examiner

G. W. O'CONNOR, Assistant Examiner